United States Patent
Conti

(10) Patent No.: US 8,550,695 B2
(45) Date of Patent: Oct. 8, 2013

(54) BLENDER WITH VARYING INTERNALLY AND EXTERNALLY SHAPED CONTAINER

(75) Inventor: Michael P. Conti, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/241,743

(22) Filed: Sep. 23, 2011

(65) Prior Publication Data
US 2013/0077433 A1      Mar. 28, 2013

(51) Int. Cl.
| B01F 13/00 | (2006.01) |
| B01F 11/00 | (2006.01) |
| B01F 7/00  | (2006.01) |

(52) U.S. Cl.
USPC ............................ 366/205; 366/242; 366/251

(58) Field of Classification Search
USPC ...................... 366/205; 241/282.2; 192/69.81; 215/383, DIG. 8; 384/130
See application file for complete search history.

(56) References Cited

U.S. PATENT DOCUMENTS

| 2,278,125 | A |   | 3/1942  | Landgraf |         |
|-----------|---|---|---------|----------|---------|
| 2,284,155 | A |   | 5/1942  | Landgraf |         |
| 2,352,205 | A | * | 6/1944  | Karlson  | 366/341 |
| 2,794,627 | A | * | 6/1957  | Rodwick  | 241/282.2 |
| D336,590  | S |   | 6/1993  | Barnard  |         |
| 5,487,511 | A |   | 1/1996  | Sansone  |         |
| 5,584,577 | A |   | 12/1996 | Thies    |         |
| 5,655,834 | A | * | 8/1997  | Dickson  | 366/205 |
| 5,823,672 | A | * | 10/1998 | Barker   | 366/205 |
| 6,092,922 | A | * | 7/2000  | Kett et al. | 366/205 |
| 6,550,703 | B2 |   | 4/2003  | Williams et al. |  |
| 7,063,456 | B2 | * | 6/2006  | Miller et al. | 366/205 |
| D528,363  | S |   | 9/2006  | Ulanski et al. |   |
| 7,350,963 | B2 |   | 4/2008  | Williams et al. |  |
| D587,526  | S |   | 3/2009  | Barnard et al. |   |
| 7,753,223 | B2 |   | 7/2010  | Boozer et al. |    |
| D621,656  | S |   | 8/2010  | Ulanski et al. |   |
| 2005/0122837 | A1 |   | 6/2005 | Bravard et al. |  |
| 2009/0114616 | A1 |   | 5/2009 | White |           |
| 2009/0238034 | A1 |   | 9/2009 | Ulanski |         |
| 2010/0027373 | A1 | * | 2/2010 | Barnard et al. | 366/347 |
| 2011/0013478 | A1 |   | 1/2011 | Athey et al. |     |

FOREIGN PATENT DOCUMENTS

| CN | 2445692 Y | 9/2001 |
| CN | 2936081 Y | 8/2007 |

OTHER PUBLICATIONS

EP Search Report dated Jan. 13, 2013, Application No. 12185509.2, Whirlpool Corporation.

\* cited by examiner

*Primary Examiner* — Tony G Soohoo
*Assistant Examiner* — Anshu Bhatia

(57) ABSTRACT

A blender includes a container having a plurality of substantially triangular shaped ribs projecting into a processing zone of the container. The plurality of spaced ribs each include a width and a depth that taper from a top end section adjacent a teardrop shaped opening of the container to a more narrow bottom end section adjacent a bottom wall of the container. A side wall of the container continuously tapers from the teardrop shaped opening to a substantially square shaped bottom end portion including first, second, third and fourth side wall sections connected to one another at respective rounded corners. A blade assembly is coupled to the container and includes a plurality of blades angled at different planes with respect to a horizontal plane. Each of the blades includes a beveled leading edge, resulting in a downward suction force that draws ingredients down into the blade for processing.

18 Claims, 5 Drawing Sheets

BLENDER WITH VARYING INTERNALLY AND EXTERNALLY SHAPED CONTAINER

BACKGROUND OF THE INVENTION

1. Field of the Invention

The present invention pertains to the art of small appliances and, more particularly, to a blender container or jar which internally and externally varies in shape to improve blending performance, as well as its method of use.

2. Discussion of the Related Art

Blenders and similar countertop kitchen appliances generally include a base upon which is situated a jar into which food or other contents can be placed. Typically, blender jars are constructed with a generally circular or oval-shaped cross section. Blades or a similar implement can be activated to operate on the contents of the jar. The jar is generally removable from the base for ease of use and cleaning. The base contains a motor and controls for operating the appliance, whereby the motor drives the blades in response to activation of one of the controls. One example of a circular blender jar can be seen in U.S. Patent Application Publication No. 2011/0013478. Generally, blenders provide the user with a selection of processing methods on a keypad, such as Stir, Chop, Mix, Puree, and Liquify. These methods reflect built-in speeds or control algorithms that enable the user to process a wide range of recipes, such as in the Puree of Soups to the Liquification of Icy Drinks and Fruit Smoothies. Surprisingly enough, even though blenders have been around for more than 70 years, improvements can still be made to enhance blender performance. For instance, a typical drawback of blender models on the market today is that good processing performance in one area often comes at the expense of good processing performance in other areas. As one example, one can find narrow, funnel shaped blender containers that are generally capable of pureeing recipes such as soups to a smooth consistency. However, these narrow, funnel shaped containers are often not as capable in the chopping and processing of large food items such as ice or icy drinks, as these large food items are not able to make their way through the narrow container necks and into the path of the blades.

SUMMARY OF THE INVENTION

The present invention is directed to a blender including an improved blender container having a container geometry which helps to enhance performance throughout a wide range of recipes (as in the puree of soups to the liquification of icy drinks and fruit smoothies), a wide range of recipe volumes (as in full batch to half batch), and a range of ingredient temperatures (as in frozen to room temperature). The container includes a plurality of substantially triangular shaped ribs projecting into a processing zone of the container. Each of the plurality of spaced ribs includes a width and a depth that taper from a top end section adjacent a teardrop shaped opening of the container to a more narrow bottom end section adjacent a bottom wall of the container. A side wall of the container continuously tapers from the teardrop shaped opening to a substantially square shaped lower end portion including first, second, third and fourth side wall sections connected to one another at respective rounded corners. A handle is attached to an outer portion of the side wall opposite a pour spout. A blade assembly is coupled to the container and includes a plurality of blades extending at varying angles and in different planes with respect to a horizontal plane. Each of the blades includes a beveled bottom leading edge, resulting in a downward suction force that draws ingredients down into the blade for processing.

During use, control elements of the blender may be utilized to initiate the rotation of the blade assembly. As indicated above, operation of the blades establishes a suction force to draw ingredients down into the blades, where the ingredients are chopped or otherwise processed. Ingredients within the blender contact the ribs as they are moved within the processing zone, causing a folding or mixing action of the ingredients within the container.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
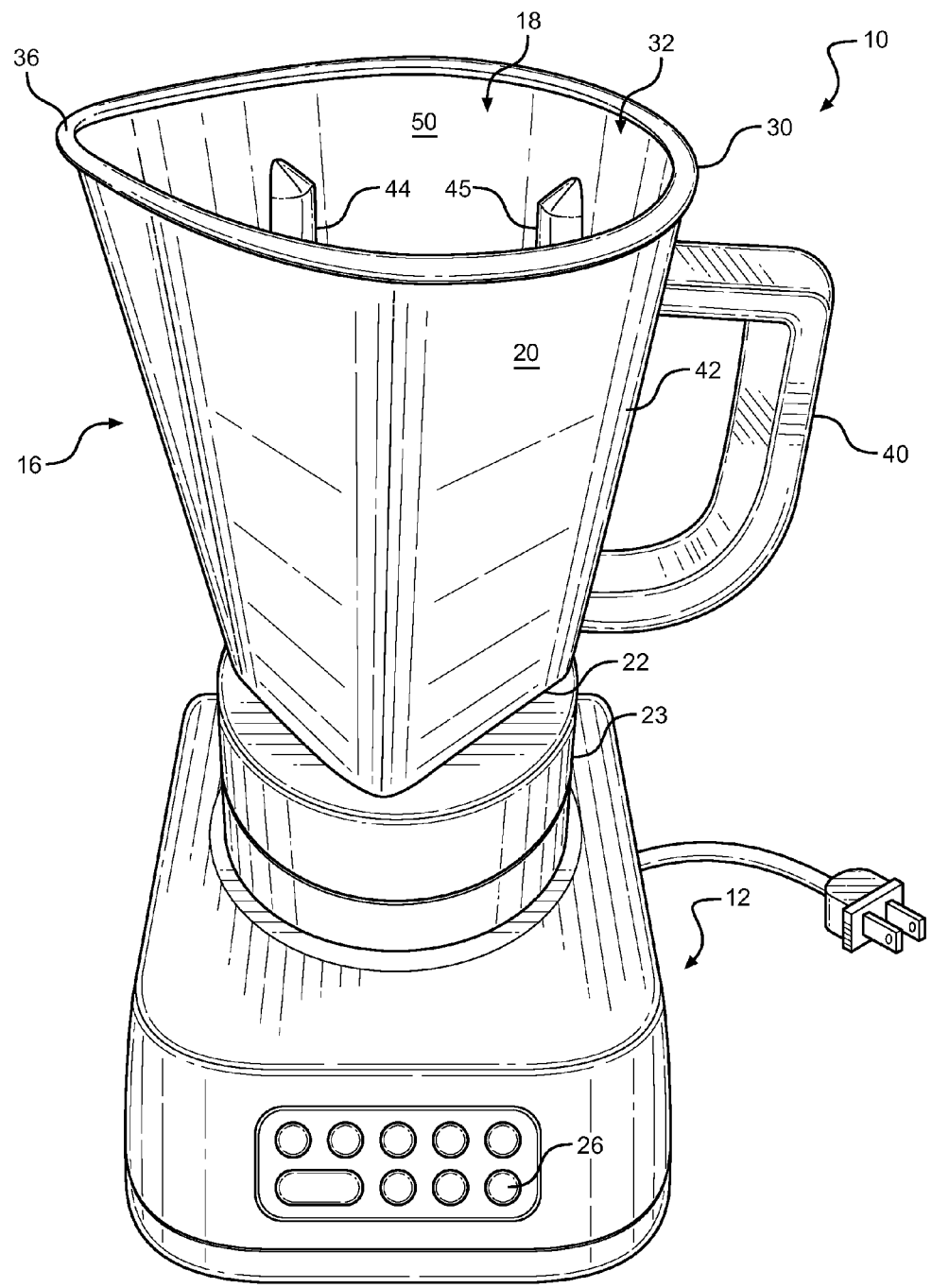
FIG. 1 is a front perspective view of a blender assembly of the present invention.

With initial reference to FIG. 1, a blender 10 is shown including a base section 12 and a removable blender jar or container 16 constructed in accordance with the present invention. With reference to both FIGS. 1 and 2, blender container 16 includes a processing zone 18 defined by a side wall 20 and a bottom wall 22. Additionally, a base portion 23 of blender container 16 extends downward from bottom wall 22 and provides an engagement means to connect blender container 16 to base section 12. In the most preferred embodiment, blender container 16 is molded from polycarbonate, although container 16 could be made from any food compatible and dishwasher safe material.

Figure 2:
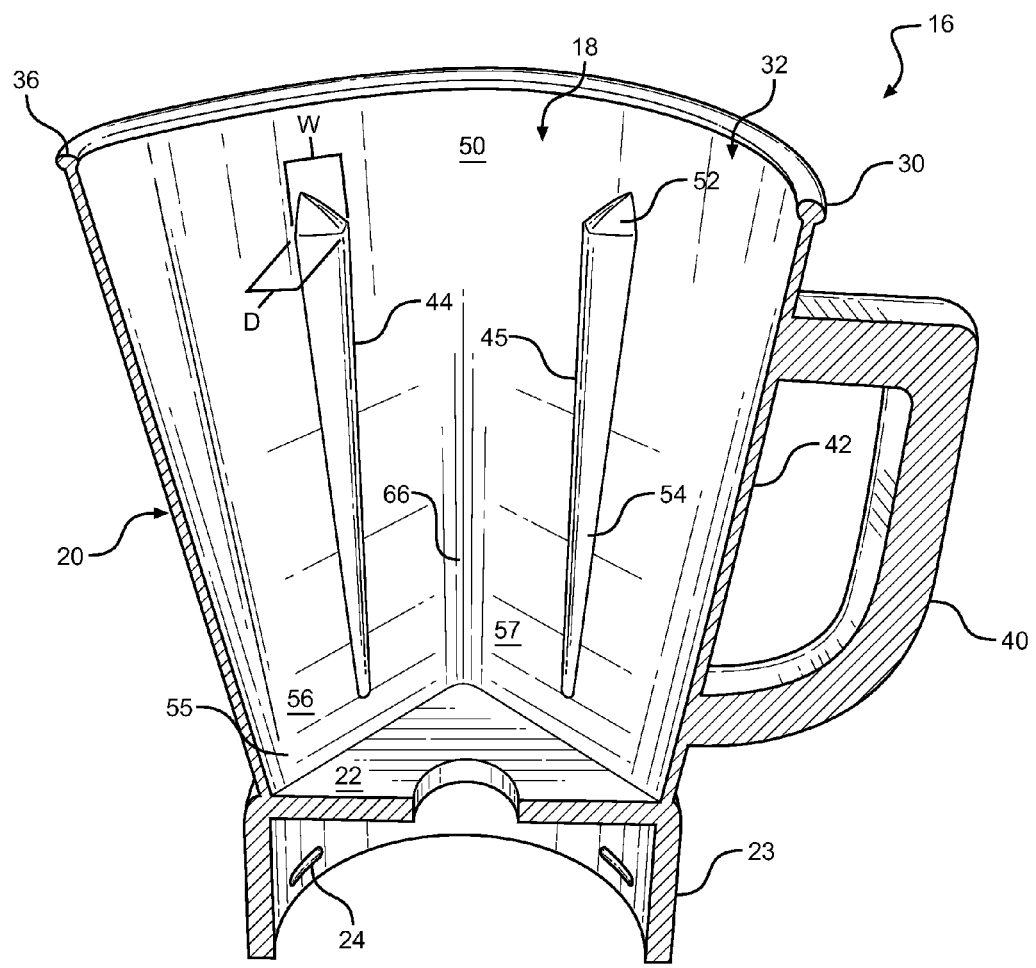
FIG. 2 is a cross-sectional side view of the blender container of FIG. 1.

At this point, it should be understood that base portion 23 can engage base section 12 in any known manner in the art. For example, as depicted in FIG. 2, base portion 23 can include coupling flanges indicated at 24 that are adapted to engage mounting portions (not shown) of base section 12 to secure base portion 23 to base section 12 upon a slight relative rotation. Such attachment methods are well known in the art and not considered part of the present invention such that they will not be discussed in detail herein. In addition, base section 12 can include any known type of blender drive system. That is, although not depicted, it is well known in the art to provide a base section of a blender with a motor for engaging and driving a blade assembly, as well as various control elements such as those indicated at 26. The specific controls, as well as details of base section 12, do not constitute part of the present invention, and one skilled in the art would understand how to utilize known blender drive technology in connection with the present invention.

With continued reference to FIGS. 1 and 2, side wall 20 includes a top portion 30 defining an upper opening 32 that provides access to processing zone 18. In a manner known in the art, a lid (not shown) can be utilized to selectively seal upper opening 32, such as during a food blending event. As shown, upper opening 32 is substantially tear-drop shaped, and a narrow end of upper opening 32 defines a pour spout 36. A handle 40 is provided along an outer portion 42 of side wall 20 opposite pour spout 36. Handle 40 can be any type of handle configured to allow a user to grip the handle and manipulate blender container 16.

Figure 3:
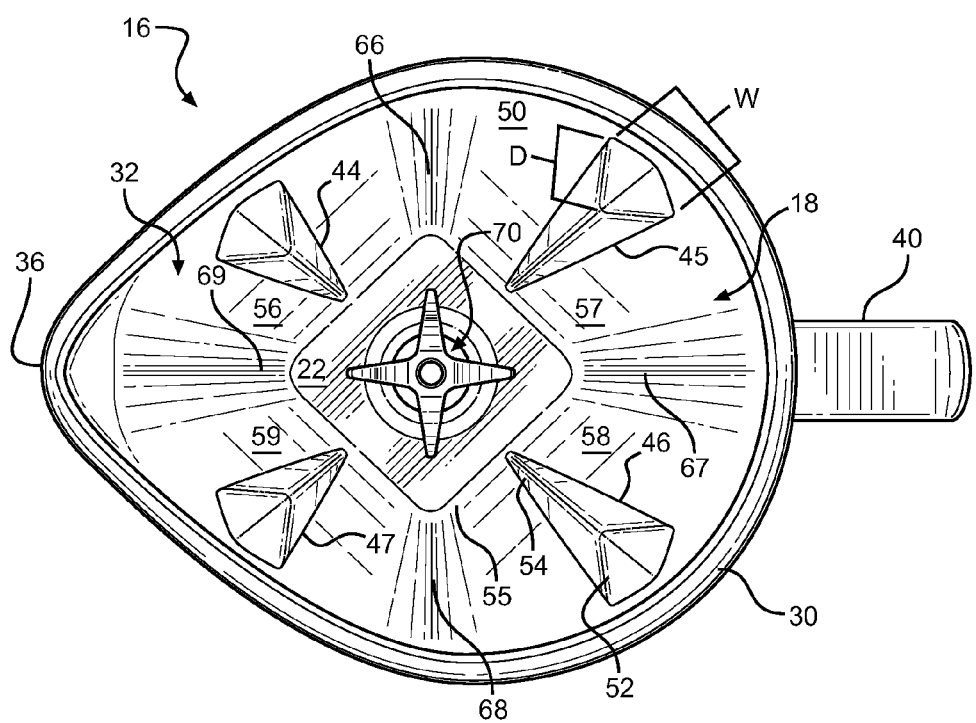
FIG. 3 is a top view of the blender container of FIG. 1.

With particular reference to FIGS. 2 and 3, a plurality of spaced ribs indicated at 44-47 project from an inner portion 50 of side wall 20 within processing zone 18. In the preferred embodiment, each of the plurality of spaced ribs 44-47 has a substantially polygonal, most preferably substantially triangular, shape in cross-section including a width W and a depth D both of which taper from a top end section 52 spaced below upper opening 32 to a more narrow bottom end section 54 spaced from but directly adjacent bottom wall 22. In one embodiment, each of ribs 44-47 has a beginning depth D of approximately 13.5 mm and a beginning width W of approximately 23.4 mm. This narrowing rib profile has been found to provide additional "folding" or mixing action of contents at any horizontal plane within container 16, thus increasing blending performance. In accordance with the preferred embodiment of the present invention, side wall 20 terminates in a substantially square shaped bottom end section 55 defined by first, second, third and fourth side wall sections 56-59 connected to one another at respective corners 66-69, with corners 66-69 being substantially equally spaced from respective ones of the plurality of spaced ribs 44-47. With this arrangement, container 16 tapers in a substantially continuous manner from substantially tear-drop shaped upper opening 32 to substantially square shaped bottom end section 55. That is, container 16 tapers from a more rounded geometry at upper opening 32 to a polygonal geometry at bottom end section 55. Preferably, corners 66-69 are maintained slightly rounded, which enhances blending performance and effectively aids in cleaning food or other contents from within container 16. The dimension of each side wall section 56-59 at the bottom end section 55 is preferably in the range of 62.8-82.8 mm. Interestingly, significant performance degradation was found to occur when the dimensions of bottom end section 55 exceeded these optimal parameters. With this arrangement, container 16 tapers in a substantially continuous manner from substantially tear-drop shaped upper opening 32 to substantially square shaped bottom end section 55, where the transition of tear-drop to square shape occurs approximately ½ down the wall of the container.

Figure 4:
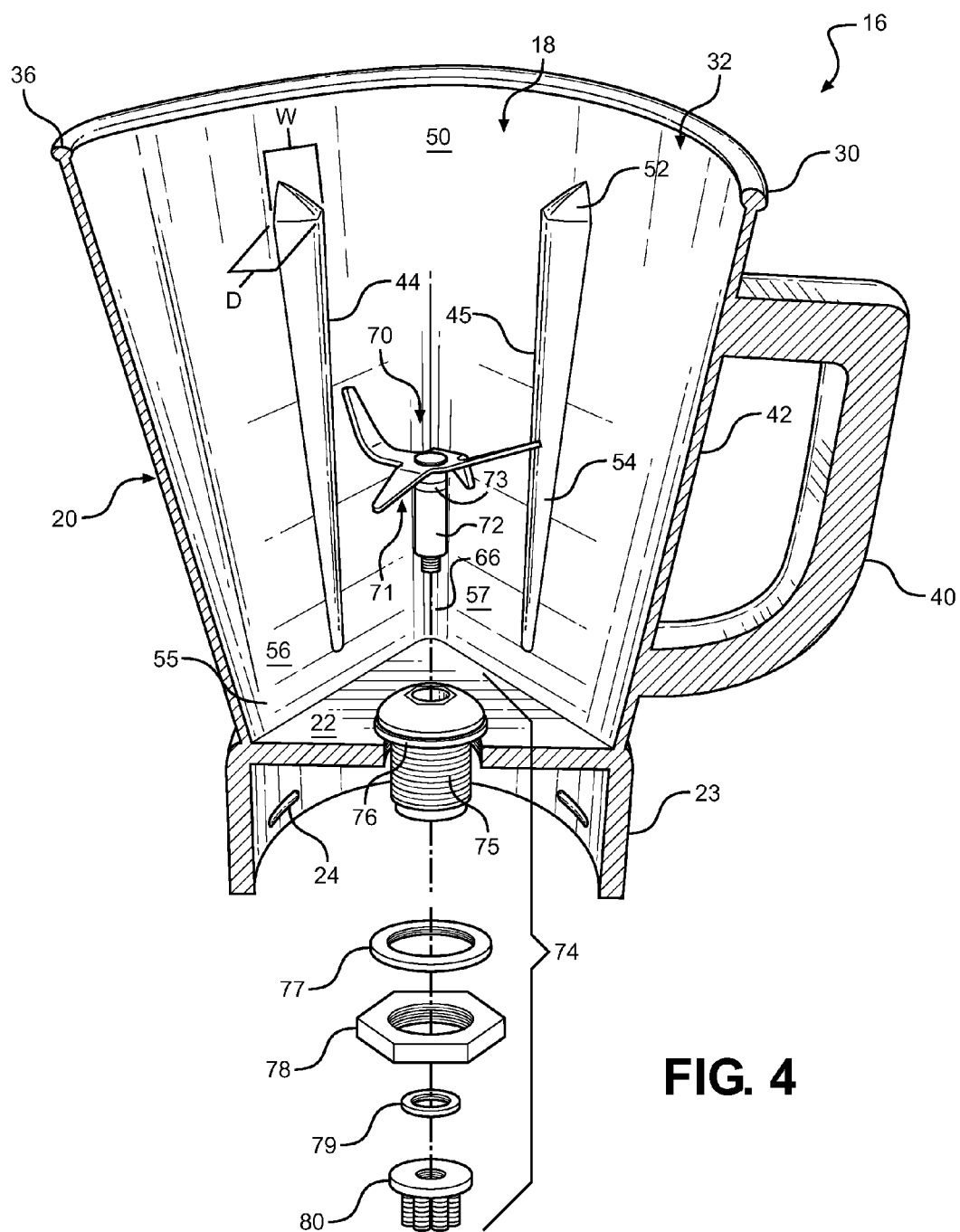
FIG. 4 is an exploded, cross-sectional side view of the blender container of FIG. 1 including a blade assembly.

A blade assembly 70 for use with container 16 will now be discussed in more detail with reference to FIG. 4. Blade assembly 70 includes a blade set indicated at 71 extending from a shaft assembly 72 having a rubber gasket 73 extending thereabout. A coupling assembly indicated at 74 is employed to connect blade set 71 to bottom wall 22 of container 16. Although other known coupling arrangements could be employed, in the embodiment shown, coupling assembly 74 includes an externally threaded bearing 75, a flexible rubber seal 76 configured to extend between a head portion (not labeled) of bearing 75 and bottom wall 22, a metal washer 77 configured to seat against seal 76, a nut 78 for threading onto bearing 75 to secure bearing 75 to bottom wall 22, a smooth Teflon® washer 79 and a drive coupling 80 for threading onto shaft assembly 72.

Figure 5A:
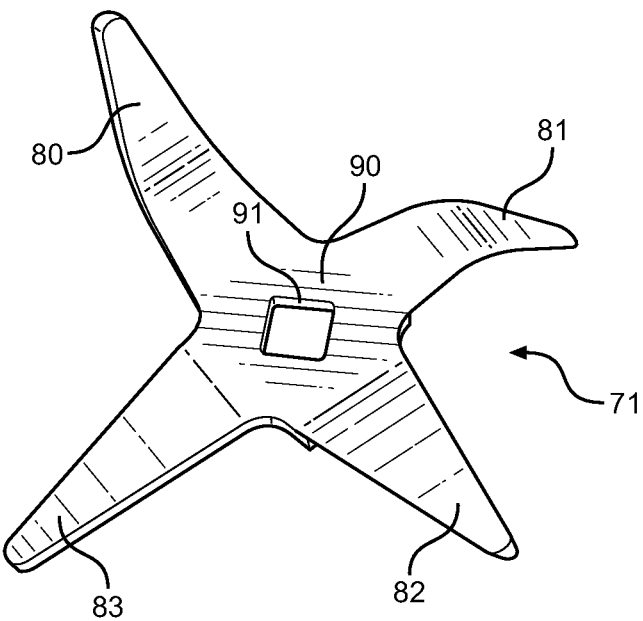
FIG. 5A is an upper perspective view of a blade set for use with the present invention.
Figure 5B:
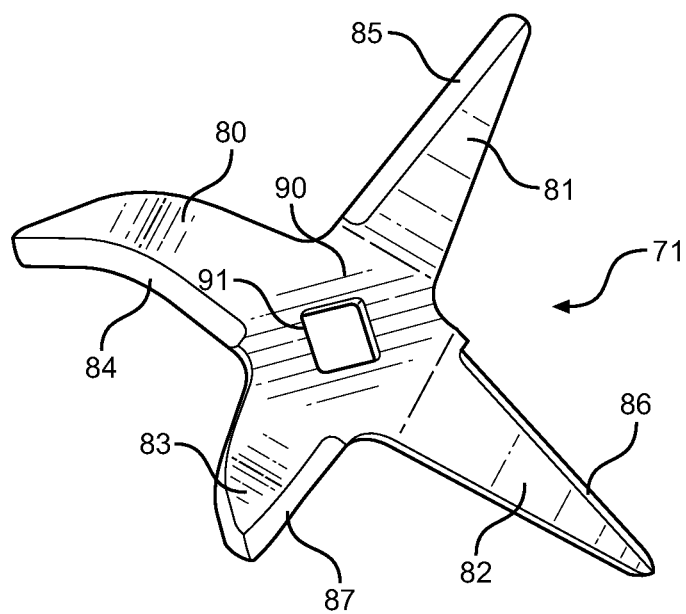
FIG. 5B is a lower perspective view of the blade set of FIG. 5A.

The details of blade set 71 will now be discussed with particular reference to FIGS. 4, 5A and 5B, wherein blade set 71 is shown removed from shaft assembly 72. Blade set 71 includes four cutting blades 80-83 which are distinctly angled or oriented to process ingredients in four different planes. That is, each of blades 80-83 has a different orientation with respect to the horizontal. As perhaps best shown in the preferred embodiment represented in FIGS. 4 and 5A, blade 80 preferable angles abruptly upward generally in the order of 75-80°, blade 81 angles abruptly downward generally in the order of 50-55°, blade 82 angles slightly upward generally in the order of 19-25° and blade 83 angles slightly downward generally in the order of 15-18°. With reference to FIG. 5B, it can be seen that each blade 80-83 includes a respective leading edge 84-87 which is beveled from on a bottom surface 90 of each blade 80-83. When blade set 71 is rotated, the beveled edges 84-87 provide a downward suction force to draw ingredients down into the blade for processing. It should be understood that, when mounted for use, shaft assembly 72 extends through a polygonal-shaped aperture 91 formed in bottom surface 90 to drivingly interconnect shaft assembly 72 to blade set 71 as depicted in FIG. 4.

In use, container 16 is connected to base section 12 of blender 10 and ingredients are inserted into processing zone 18. Control elements 26 are utilized by a user to activate blender 10, and thereby initiate the rotation of blade set 71. Spinning blade set 71 provides a central, downward suction force to draw ingredients down into blade 71, where they are chopped or otherwise processed. Ingredients within the blender contact ribs 44-47 as they are moved within the blender, causing a folding or mixing action of the ingredients within container 16. Once a mixing or blending event has been terminated, the processed ingredients can be poured out of container 16 via pour spout 36.

The nature of container 16, having wall tapering which starts from a more turbulent square shape at bottom to a less turbulent teardrop shape at top and is counterbalanced by an opposingly tapered series of triangular shaped ribs, acts to enhance the blending performance at any horizontal processing plane. This enhanced performance has been demonstrated through a series of tests where the performance of the container has been verified to be more robust to a wide range of recipes (as in the puree of soups to the liquification of icy drinks and fruit smoothies), various recipe volumes (as in full batches to half batches or less), and a range of ingredient temperatures (as in frozen to room temperature). More specifically, experiments were conducted comparing the container 16 of the present invention to a current production rounded container constructed in accordance with the Whirlpool 560 JP container shown in U.S. Patent Application No. 20110013478. It was found that, in general, container 16 completed blending in a smaller amount of time versus the rounded container with no ribs. While not wishing to be bound by the theory, it is thought that corners 66-69 function in conjunction with ribs 44-47 to provide more turbulence in the generally laminar flow of ingredients. This created turbulence enhances the folding action of ingredients into the path of blade set 71, thus enhancing the blending performance of container 16. Experimental results are depicted below in Tables 1-6. Initially, ingredients for a strawberry banana smoothie were put into container 16 and the current production container, and blended for 10 seconds at a high speed. Container 16 outperformed the current production container for both a full recipe run and a half recipe run.

TABLE 1

Strawberry Banana Smoothie: % Processed at 10 Seconds

| Jar Type | Current Production Jar | Tapered Square Jar |
| --- | --- | --- |
| Full Recipe | 99.8* | 100 |
| Half Recipe | 99.9 | 100 |

(results for an average of two runs)
*Results not repeatable at 10 seconds.

TABLE 2

| Ice Crush Test - Rubbermaid™ tray: % Processed at 25 Seconds | | |
|---|---|---|
| Jar Type | Current Production Jar | Tapered Square Jar |
| Full Recipe | 97.2 | 98.5 |
| Half Recipe | 98.9 | 100 |

(results for an average of two runs)

Table 2 above illustrates the results of an ice crush test utilizing ice cubes from a 16 count Rubbermaid™ ice tray, i.e., a 16 count ice tray for making ice cubes generally 49 mm×28 mm×27 mm in size. Ice was added to container 16 and the current production container, and blended for 25 seconds. The current production container produced a product having a wet snow consistency, with 13 ice chunks remaining for the full recipe and 12 ice chunks remaining for the half recipe. Container 16 of the present invention produced a product having a powdery snow-like consistency, with 12 ice chunks remaining for the full recipe and 0 ice chunks remaining in the half recipe. The same experiment was conducted using a Whirlpool™ 14 count ice tray, i.e., 1 14 count ice tray for making ice cubes roughly 43.25 mm×32.25 mm×26.5 mm in size, the results of which are presented below in Table 3. The current production container produced a product having 14 ice chunks remaining for the full recipe and 3 large ice chunks remaining for the half recipe. Container 16 of the present invention produced a product having a powdery snow-like consistency, with 2 ice chunks remaining for the full recipe and 2 ice chunks remaining in the half recipe.

TABLE 3

| Ice Crush Test - Whirlpool™ tray: % Processed at 25 Seconds | | |
|---|---|---|
| Jar Type | Current Production Jar | Tapered Square Jar |
| Full Recipe | 98.1 | 99.8 |
| Half Recipe | 99.2 | 99.7 |

(results for an average of two runs)

TABLE 4

| Cranana-Daiquiri: % Processed at 30 Seconds | | |
|---|---|---|
| Jar Type | Current Production Jar | Tapered Square Jar |
| Full Recipe | 100 | 100 |
| Half Recipe | 96.9 | 99.9 |

(results for an average of two runs)

Table 4 illustrates another experiment wherein frozen drink ingredients were mixed at 30 seconds at high speeds in both the current production jar and container 16 of the present invention. The current production jar resulted in various small ice particles so as to be gritty, while container 16 resulted in a smooth texture in the half recipe run.

TABLE 5

| Broccoli Soup Puree: % Processed | | |
|---|---|---|
| Jar Type | Current Production Jar | Tapered Square Jar |
| Full Recipe | 98.4 | 99.0 |
| Half Recipe | 95.9 | 99.0 |

(results for an average of two runs)

Table 5 illustrates yet another experiment wherein the ingredients for broccoli soup were mixed in both the current production container and container 16. The current production jar produced a product having 2 chunks in the full recipe and 4 chunks in the half recipe, whereas container 16 produced 0 chunks in the full recipe and only 2 chunks in the half recipe.

TABLE 6

| Tomato Soup Puree: % Processed | | |
|---|---|---|
| Jar Type | Current Production Jar | Tapered Square Jar |
| Full Recipe | 99.4 | 99.3 |
| Half Recipe | 99.5 | 99.6 |

(results for an average of two runs)

A final experiment, the results of which are presented in Table 6 above, was conducted wherein tomatoes where mixed in both the current production jar and container 16. The current production jar produced a product including 1 chunk in the full recipe and 0 chunks in the half recipe. Container 16 produced a product having 0 chunks in either the full recipe or half recipe.

From the above experimental results it can be seen that, overall, container 16 outperforms the prior art container and advantageously reduces time required for thorough processing of ingredients. More specifically, the overall shape of the container, the details of the ribs and the configuration of the blade assembly synergistically combine in various ways to provide for enhanced blending performance. In addition, the nature of the container design not only enhances blending performance but the unique teardrop shape also acts as an integrated pouring spout, thus enhancing pouring performance. Although described with reference to preferred embodiments of the invention, it should be readily understood that various changes and/or modifications can be made to the invention without departing from the spirit thereof. In general, the invention is only intended to be limited by the scope of the following claims.

What is claimed is:

1. A blender container comprising:
a processing zone defined by a side wall and a bottom wall, the side wall including:
a top portion defining an upper opening to the processing zone, the top portion including a pour spout formed therein;
an outer portion;
a handle attached to the outer portion opposite the pour spout, the handle configured to be gripped by a user;
an inner portion within the processing zone;
a plurality of substantially polygonal shaped, spaced ribs projecting into the processing zone from the inner portion of the side wall, each of the plurality of spaced ribs including a width and a depth, wherein both the width and the depth taper from a top end section adjacent the upper opening to a more narrow bottom end section adjacent the bottom wall;
a Substantially square shaped bottom end portion of the side wall including first, second, third and fourth side wall sections connected to one another through respective rounded corners, wherein the rounded corners are spaced from each of the plurality of spaced ribs; and
the upper opening is substantially teardrop shaped and a narrow portion of the teardrop shape defines the pour spout, wherein the substantially teardrop shape includes a large convex curve interconnected with substantially linear inwardly converging edges to the pour spout.

2. The blender container of claim 1, wherein the plurality of spaced ribs are substantially triangular in cross-section.

3. The blender container of claim 2, wherein the plurality of spaced ribs constitute four ribs.

4. The blender container of claim 1, wherein the side wall continuously and gradually transitions from the substantially square shaped bottom end portion to the substantially teardrop shaped upper opening.

5. The blender container of claim 1, wherein each of the spaced ribs has a maximum depth of approximately 13.5 mm and a maximum width of approximately 23.4 mm.

6. The blender container of claim 1, wherein each of the first, second, third and fourth side wall sections of the substantially square shaped end portion is approximately 62.8-82.8 mm in length.

7. The blender container of claim 1, further comprising:
a blade assembly coupled to the container, wherein the blade assembly comprises a blade set including a plurality of blades, and wherein each of the plurality of blades extends at a different angle with respect to a horizontal plane.

8. The blender container of claim 7, wherein the plurality of blades constitute four blades which extend at angles of 75-80°, 50-55°, 19-25° and 15-18° respectively from the horizontal plane.

9. The blender container of claim 7, wherein each of the plurality of blades includes a leading edge that is beveled on a bottom surface thereof such that, during use, the beveled edges provide a downward suction force to draw ingredients down into the blade for processing.

10. A blender comprising:
a base section including a plurality of control elements; and
a blender container configured to set upon the base section, said blender container including:
a circular base configured to engage the base section;
a processing zone extending upwardly and separate from the circular base, the processing zone defined by a side wall and a substantially square bottom wall, wherein the side walls extend asymmetrically upward from the square bottom wall, the side wall including:
a top portion defining an upper opening to the processing zone, the top portion including a curved pour spout formed therein;
an outer portion;
an inner portion within the processing zone;
a plurality of substantially polygonal shaped, spaced ribs projecting into the processing zone from the inner portion of the side wall, each of the plurality of spaced ribs including a width and a depth, wherein both the width and the depth taper from a top end section adjacent the upper opening to a more narrow bottom end section adjacent the bottom wall;
a substantially square shaped bottom end portion of the side wall including first, second, third and fourth side wall sections connected to one another through respective rounded corners, wherein a transition from the square shaped bottom end portion extends asymmetrically to the top portion, wherein the rounded corners are spaced from each of the plurality of spaced ribs; and
the upper opening is substantially teardrop shaped and a narrow portion of the teardrop shape defines a curved pour spout, wherein the substantially teardrop shape includes a large convex curve interconnected to the curved pour spout with converging edges.

11. The blender of claim 10, wherein the plurality of spaced ribs constitute four ribs.

12. The blender of claim 10, wherein the side wall continuously and gradually transitions from the substantially square shaped end bottom portion to the substantially teardrop shaped upper opening.

13. The blender of claim 10, wherein each of the spaced ribs has a maximum depth of approximately 13.5 mm and a maximum width of approximately 23.4 mm.

14. The blender of claim 10, wherein each of the first, second, third and fourth side wall sections of the substantially square shaped end portion is approximately 62.8-82.8 mm in length.

15. The blender of claim 10, further comprising: a handle attached to the outer portion opposite the pour spout, the handle configured to be gripped by a user.

16. The blender of claim 10, further comprising:
a blade assembly coupled to the container, wherein the blade assembly comprises a blade set including a plurality of blades, and wherein each of the plurality of blades extends at a different angle with respect to a horizontal plane.

17. The blender of claim 16, wherein each of the plurality of blades includes a leading edge that is beveled on a bottom surface thereof such that, during use, the beveled edges provide a downward suction force to draw ingredients down into the blade for processing.

18. A method of processing ingredients in a blender including a base having at least one control element, a blender container supported on the base, and a blade set attached to the blender container, the method comprising:
inserting ingredients into a processing zone of the blender container;
initiating a processing event utilizing the control element such that the blade set rotates and establishes a downward suction force to draw the ingredients down into the processing zone, while also causing the ingredients to be effectively mixed by movement across a plurality of polygonal shaped spaced ribs projecting into the processing zone from an inner side wall portion of the blender container and tapering in both width and depth from a top end section adjacent an opening of the blender container to a more narrow bottom end section, that is substantially square shaped, adjacent a bottom wall of the blender container, wherein the inner side wall portion of the blender container extends asymmetrically upward from a circular base section to the square shaped bottom wall to the top end section;
the opening of the blender container is substantially teardrop shaped and a narrow portion of the teardrop shape includes a lame convex curve interconnected with converging edges to the pour spout; and
terminating the processing event after a desired processing time has elapsed.

* * * * *